United States Patent [19]

Garg et al.

[11] Patent Number: 4,786,418
[45] Date of Patent: Nov. 22, 1988

[54] PROCESS FOR AQUEOUS STREAM PURIFICATION

[75] Inventors: Desh R. Garg, Fishkill; Carl J. Kjellson, White Plains, both of N.Y.; Brent M. Lok, Ridgefield, Conn.; Craig H. Barkhausen, Denville, N.J.

[73] Assignee: Union Carbide Corporation, Danbury, Conn.

[21] Appl. No.: 167,185

[22] Filed: Mar. 11, 1988

[51] Int. Cl.[4] .............................................. C02F 1/28
[52] U.S. Cl. .................................... 210/673; 210/691; 210/763
[58] Field of Search ................. 210/673, 691, 763

[56] References Cited

U.S. PATENT DOCUMENTS

4,648,977  3/1987  Garg et al. ......................... 210/673

Primary Examiner—Ivars Cintins
Attorney, Agent, or Firm—Richard G. Miller

[57] ABSTRACT

In the process for removing organic impurity constituents from aqueous media by adsorbing same on an organophilic molecular sieve adsorbent, followed by regeneration of the adsorbent by contact with an oxidant, such as hydrogen peroxide, whereby the organic adsorbate is converted to innocuous materials, principally $CO_2$ and $H_2O$, the efficiency of the regeneration operation is found to be substantially improved by decreasing the pH of the regenerating medium and/or increasing the number of Bronsted acid sites in the molecular sieve adsorbent.

15 Claims, 4 Drawing Sheets

PROCESS FOR AQUEOUS STREAM PURIFICATION

FIELD OF THE INVENTION

The present invention relates in general to the removal of organic impurities from aqueous media such as potable water supplies using organophilic molecular sieve adsorbents. The organic contaminants are selectively adsorbed on the molecular sieve and effectively destroyed during regeneration of the adsorbent by conversion to innocuous materials such as $CO_2$ and $H_2O$ by reaction with a strong oxidant such as hydrogen peroxide. The efficiency of this regeneration reaction is found to be significantly enhanced by lowering the pH of the regeneration medium and/or increasing the number of Bronsted acid sites in the molecular sieve adsorbent.

DISCUSSION OF THE PRIOR ART

The contamination of supplies of potable water is a major public health concern throughout the world. Sources of ground water contamination are many and varied and include land fills, agricultural pesticides, leakage from stored gasoline, septic tanks, mining operations, petroleum and natural gas production and improperly constructed and maintained industrial toxic waste dumps. The discharge of chlorinated organics into the environment, is a cause of particular concern because of the known or suspected carcinogenic or mutagenic properties of some of these materials and the difficulty with which they are biologically degraded. In many instances chlorinated and other halogenated organic compounds pass through conventional industrial or municipal wastewater treatment plants essentially unaltered.

Several techniques have heretofore been proposed to detoxify or treat contaminated water, principal among which are the so-called air stripping procedure and the method involving the adsorption of the organic substrates on granulated activated carbon (GAC adsorption). The air stripping process involves stripping the volatile organics from water by contacting the contaminated water with air, most commonly in a countercurrent manner in a packed tower. Contaminated water is introduced at the top of the tower and as it flows down the tower, the volatile organics are stripped off by air that is flowing upwards following introduction at the bottom of the tower. The treated "clean" water is withdrawn at the bottom. A serious disadvantage with this technique is that the air, that is now contaminated with stripped off organics, is discharged into the atmosphere from the top of the tower. The organic pollutants are thus merely transferred from water to air. The technique, therefore, does not get rid of the undesirable pollutants. Other disadvantages to the method are the inability to deal with non volatile contaminants such as certain pesticides, and the tendency for the stripping tower to be affected by biological growth.

GAC adsorption processes are capable of removing both volatile and non volatile contaminants from aqueous media, but require expensive high carbon usage to obtain a purified water having non detectable levels of impurity. Also, the adsorption system is cumbersome to regenerate and, in any event, causes a secondary pollution problem in the disposal of the adsorbed impurities. A combination of both types, i.e. the air stripping and the GAC adsorption process is disclosed in U.S. Pat. No. 4,544,488 issued Oct. 1, 1985 to R. P. O'Brien. Other processes are disclosed in U.S. Pat. No. 4,526,692 issued July 2, 1985 to T. L. Yohe and U.S. Pat. No. 4,517,094 issued May 14, 1985 to G. W. Beall. It is also well known to disinfect or sanitize aqueous media such as recirculating water systems, effluents from food processing industries, paper mills, sewage stations and the like by the introduction of very strong oxidizing agents such as ozone. In this regard, see U.S. Pat No. 4,541,944 issued Sept. 17, 1985 to Sanderson.

A more recent development in the field is the adsorption-oxidation process disclosed in U.S. Pat. No. 4,648,977 issued to D. R. Garg et al Mar. 10, 1987. In accordance with this process, which is an entirely new approach to the problem, high silica molecular sieves which preferentially adsorb relatively non-polar organic molecules over highly polar compounds such as water, are utilized to adsorb organic contaminants from aqueous streams. For cyclic operation the adsorbate-loaded molecular sieves are treated with strong oxidizing compounds which converts the organic materials either to less toxic compounds or to harmless carbon dioxide and water.

It was observed with respect to the prior Garg et al process that the high silica zeolite adsorbents did not merely concentrate the organic substrates for subsequent oxidation, but appeared to exhibit a catalytic activity in promoting the reaction between the organic materials and the oxidizing compound. It was theorized that trace metal impurities in the molecular sieve material were responsible for the catalytic activity, and the intentional addition of metals with known catalytic properties, such as Group VIII metals, was proposed. More recent investigations involving the intentional incorporation of catalytic metals such as copper and iron into the molecular sieve have not established any marked affect upon the oxidation of adsorbed organic substrates.

SUMMARY OF THE INVENTION

It has now been found that the hydrogen ion concentration of the oxidizing regeneration medium is a major factor which affects the oxidation of the adsorbed organic substrate in the aforesaid Garg et al process. This is particularly so in those cases where the adsorbent is highly siliceous, i.e. has a framework $SiO_2/Al_2O_3$ molar ratio of greater than about 35. In general, the higher the hydrogen ion content (the lower the pH) the more complete the removal of carbonaceous compounds from the adsorbent during the oxidative regeneration procedure. pH values of less than 7 can be employed with values less than 5 being preferred. The minimum value selected is to some extent dependent upon the $SiO_2/Al_2O_3$ ratio of the molecular sieve involved. With highly siliceous molecular sieves such as the silica polymorphs, pH values as low as about 1.0 can be used to advantage, but in the case of zeolite molecular sieves having $SiO_2/Al_2O_3$ values of less than 12, severe to moderate degradation of the adsorbent can be experienced using pH value that low.

It has further been found that the Bronsted acid sites such as those associated with $AlO_2$ tetrahedral units of the molecular sieve structure also drive the oxidation reaction. Thus the use of molecular sieves having framework $SiO_2/Al_2O_3$ ratios in the range of 5 to 100, preferably 10 to 50, and being at least partly in the hydrogen cation form, preferably containing at least 20 equivalent per cent and more preferably at least 50 equivalent per cent hydrogen cations, provides a significant improvement either alone or in conjunction with the lowering of the pH of the regeneration medium.

DETAILED DESCRIPTION OF THE INVENTION

In a cyclic process for purifying aqueous media containing dissolved organic impurities which comprises providing an aqueous feedstock containing from about 5 ppb (wt.) to about 20,000 ppm (wt.) of dissolved organic compounds, contacting said feedstock with an adsorptive mass of an organophilic zeolitic molecular sieve, said molecular sieve having pore diameters large enough to adsorb at least some of said or9anic oompounds whereby said organic compounds are adsorbed thereon and a purified water product is obtained, and thereafter regenerating said molecular sieve and oxidatively destroying at least a portion of the organic adsorbate thereon by contact with an aqueous solution of a compound having a standard oxidation potential of at least 0.25 volt, and again contacting the regenerated molecular sieve with additional water to be purified, the present invention provides an improvement in accordance with one embodiment of this invention which comprises reducing the pH of the aqueous solution of the compound having a standard oxidation potetial of at least 0.25 volt during the period said solution is in contact with the molecular sieve being regenerated to a value of not greater than 7.

The liquid aqueous feedstocks suitably treated by the process of this invention are not critical as to their source. Ground water, industrial waste water streams, effluents from municipal sewage treatment facilities and the like are all suitable feedstocks provided they contain as a solute at least 10 ppb of organic impurities. It is not a critical factor whether the impurities are considered to be volatile or non-volatile. The organic contaminants most frequently found in well water include chloro-organics such as tetrachloroethylene, trichloroethylene, 1,1,1 trichloroethane, carbon tetrachloride, chloroform, monochlorobenzene, dichlorobenzenes, methylene chloride, benzene, toluene, xylenes, ethyl benzene, chlorodibromomethane, and dibromochloropropane, and can include organic cyanides, mercaptans and certain naturally occurring organics commonly referred to as "humics". Of course, in any particular location the water feedstock may contain any organic molecular species since essentially any organic material existing in nature or synthesized by man can ultimately find its way into the environment and then into a water source.

It is important to the operability of the present process that the molecular sieve adsorbent utilized has an adsorptive preference for the less polar organic materials with respect to water. As a general rule, the more siliceous the molecular sieve, the stronger the preference for non polar adsorbate species. In the case of zeolite molecular sieves such preference is usually observable when the framework molar $SiO_2/Al_2O_3$ ratio is at least 12, and is clearly evident in those zeolite species having $SiO_2/Al_2O_3$ ratios of greater than 30. A wide variety of zeolites can now be directly synthesized to have $SiO_2/Al_2O_3$ ratios greater than 50, and still others which cannot at present be directly synthesized at these high ratios can be subjected to dealumination techniques which result in organophilic zeolite products. High temperature steaming procedures involving zeolite Y which result in hydrophobic product forms are reported by P. K. Maher et al., "Molecular Sieve Zeolites," Advan. Chem. Ser., 101, American Chemical Society, Washington D.C., 1971, p. 266. A more recently reported procedure applicable to zeolite species generally involves, dealumination and the substitution of silicon into the dealuminated lattice site. This process is disclosed in U.S. Pat. No. 4,503,023 issued Mar. 5, 1985 to Skeels et al. Many of the synthetic zeolites prepared using organic templating agents are readily prepared in a highly siliceous form—some even from reaction mixtures which have no intentionally added aluminum. These zeolites are markedly organophilic and include ZSM-12 (U.S. Pat. No. 3,832,449) and ZSM 35 (U.S. Pat. No. 4,016,245) to name only a few. It has been found that the aspect of the present invention which involves the lowering of the pH of the regeneration medium is particularly advantageous when the adsorbent material employed comprises one of the silica polymorphs known as silicalite, F-silicalite, or TEA-silicate.

Though not, strictly speaking, zeolites, because of a lack of ion-exchange capacity, these molecular sieve materials are included within the terms zeolite or molecular sieve as used herein. These materials are disclosed in U.S. Pat. Nos. 4,061,724; 4,073,865 and 4,104,294, respectively. Not only are high silica zeolites organophilic, but it has also found that they are resistant towards crystal lattice degradation from contact with the strongly oxidizing compounds used to oxidatively degrade the organic impurities in the second (or regenerative) stage of the present process, and from the contact with the strongly acidic aqueous media. The reasons why the effects of high hydrogen ion concentration in the aqueous regeneration medium are more pronounced with respect to very highly siliceous molecular sieves have not yet been fully elucidated. It is possible, that the acid sites in the less siliceous molecular sieves function independently of the extraneous acidity and have a similar catalytic effect which masks the reaction mechanism involving the extraneous acidity. It is also possible, that the acidity of the regeneration medium directly affects and enhances the very few acid sites present in the highly siliceous molecular sieves. It has been observed that silica polymorphs, as a class, exhibit acidic catalytic activity far greater than would be expected in view of the near absence of $AlO_2$ framework tetrahedral units and the acid sites associated with such units.

The oxidizing agents used to regenerate the adsorbent have a standard oxidation potential of a least 0.25 volt, and preferably between 0.5 and 2.0 volts. Illustrative of compounds which have such oxidation potentials are the chlorates ($ClO_3^-$), the hypochlorites ($OCl^-$), the permanganates ($MnO_4^-$), the dichromates ($Cr_2O_7^{-2}$) hydrogen peroxide ($H_2O_2$). These compounds have the following respective standard oxidation potentials: 0.63 volt, 0.89 volt, 1.23 volts, 1.33 volts and 1.77 volts. Compounds having an oxidation potential greater than 2.00 volts, include the peroxy-sulfates and ozone. While very effective in oxidizing the organic substrates, the compounds with oxidation potentials greater than about 2.0 tend to cause some deterioration of the zeolite crystal structure. The above mentioned compounds can contain various cations in association with the specified anions. For instance, the compounds can be in the forms of metal salts, such as the alkali metal salts, or even ammonium salts. The sole criterion being that the oxidation potential of the compound be at least 0.25 volt. As utilized to contact the organic-loaded zeolite adsorbent, the oxidizing compounds are most commonly in the form of aqueous solutions.

As in the case of the prior Garg et al. process discussed above, the concentration of the oxidant in the regeneration medium is not narrowly critical. It has been found, however, that increasing the hydrogen ion concentration results in a much more efficient utilization of the oxidant. The concentration of $H_2O_2$ in the regeneration medium in the prior Garg et al process was preferably in the range of 10 to 50 weight percent, and most preferably from 20 to 40 weight percent, and was employed in amounts 10 to 15 times the stoichiometric requirements. With the pH adjustment of the present invention, it is possible to regenerate a silicalite adsorbent with an $H_2O_2$ aqueous solution containing only 3 to 5 weight percent $H_2O_2$ and using quantities only 2 to 5 times the stoichiometric amount. This finding has considerable significance in that oxidant solutions in very high concentrations can be somewhat hazardous to handle, whereas low concentrations are relatively quite safe to utilize. Hydrogen peroxide solutions in the range of 3 to 5 percent by weight are common in ordinary household products. Accordingly, oxidant concentrations in the regeneration media used in the present process are preferably in the range of 1 to 30 weight percent and most preferably, especially in the case of $H_2O_2$, of 2 to 7 weight percent. Concentrations of from about 1 to 90 weight percent can be used. Optimum quantities and concentrations depend to some degree upon the particular molecular sieve adsorbent employed, the temperature and the period of time permitted for the regeneration step. Contact periods of from 0.5 to 72 hours are suitably used at temperatures of from 0° C. to 65° C., with ambient conditions, i.e. 10° C. to 30° C., being preferred.

In carrying out the process, the adsorption and regeneration procedures are typically accomplished by passing the feedstock to be treated and the oxidizing regenerate through a packed or fixed bed of the adsorbent. The process can, however, be carried out in a number of other arrangements common to the adsorption and water treatment art. For example, the adsorbent can be slurried in the water to be detoxified, removed therefrom by filtration, decantation, centrifugation or the like and regenerated by again being slurried in the oxidizing solution. For continuous operation, a treatment system involving at least two fixed beds of zeolite adsorbent is advantageously employed so that regeneration of spent beds can be conducted while other fresh beds are engaged in the adsorption-purification stage. Four distinct process schemes are disclosed hereinafter, each having advantages depending upon the type of organic adsorbate involved and the simplicity of equipment desired.

The various process embodiments of the present invention are illustrated below with reference the various figures of the drawings.

Figure 1:
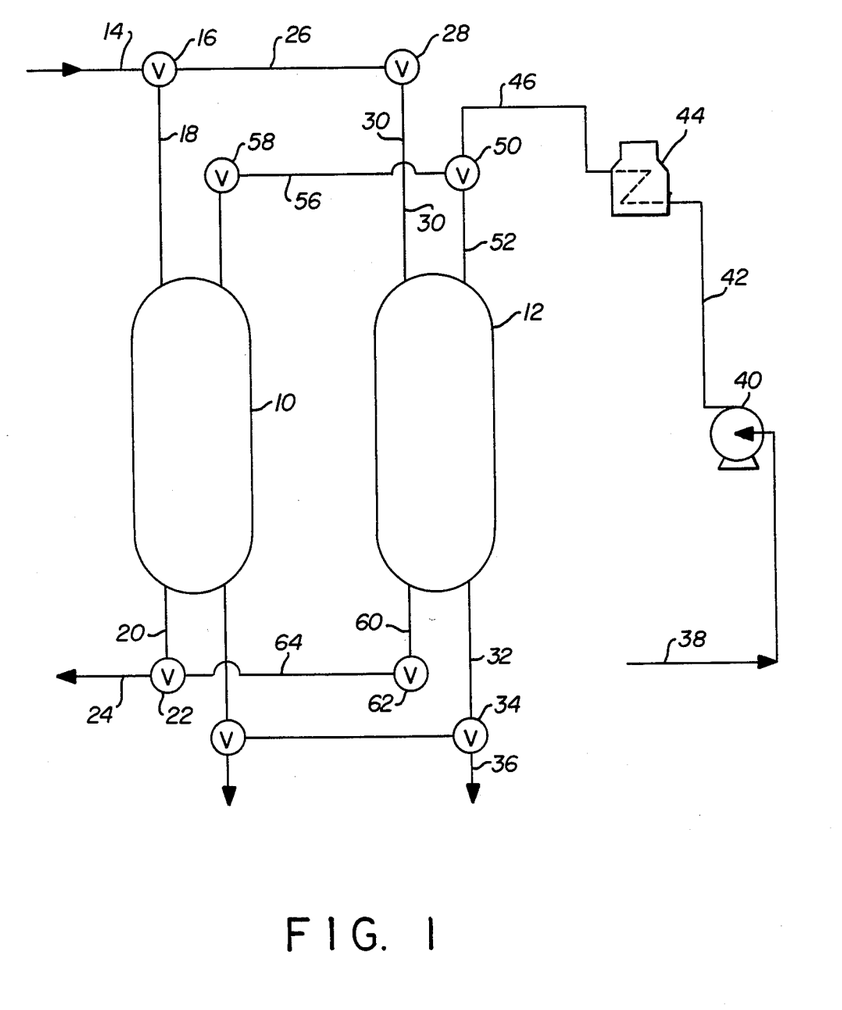
FIG. 1 is a schematic flow diagram illustrating an embodiment of the present invention of the so-called "batch soak" concept.

With reference to FIG. 1, the following procedure is carried out:

Adsorption beds 10 and 12 are packed with silica bonded silicalite particles. Feedstock water containing 200 ppm organic impurities is passed into the system through line 14, valve 16 and line 18 into the top of bed 10. During passage through bed 10 the organic content of the feedstock is selectively adsorbed on the silicalite, with the organic mass transfer zone passing downward and purified water leaving the bed through line 20, valve 22 and line 24. The adsorption is continued until just prior to breakthrough of the organic mass transfer zone, and the feedstock is then diverted to bed 12 through valve 16, line 26, valve 28 and line 30. Bed 12 has, during the period bed 10 was on adsorption, been regenerated after a previous adsorption stage therein by the following procedure: After the flow of feedstock through line 30 has been terminated, bed 12 is drained through line 32, valve 34 and line 36, and thereafter an aqueous solution of oxidizing compound such as $H_2O_2$, to which sulfuric acid has been added to lower the pH to a value of about 3, is introduced into the system through line 38 and is fed by means of pump 40 through line 42, heater 44, line 46, valve 50 and 52 downward into bed 12. After bed 12 has been filled with the acidified oxidant solution at the optimum temperature, the bed is held quiescently for a period sufficient to oxidize the organic adsorbate, at least in large part, to $CO_2$ and $H_2O$. After the desired degree of oxidation of the organic substrate, the bed is drained through line 32, valve 34 and line 36, and optionally is flushed with a diverted portion of the feedstock through valve 16, line 26, valve 28 and line 30. Thereafter the purification stage in bed 10 is terminated and regeneration therein is begun by passing oxidizing solution through valve 50, line 56, and valve 58, and feedstock water is fed into bed 12 through line 14, valve 16, line 26, valve 28 and line 30. Purified water is removed from the system through line 60, valve 62, valve 22 and line 24.

The relatively simple procedure illustrated by FIG. 1 is advantageously utilized when the loading of organic adsorbate on the molecular sieve is low or is a compound in which carbon is a small percentage of the total molecular weight. Under these conditions a relatively small amount of oxidant is required to oxidize the organic material. When loadings are high or contain a high percentage of carbon atoms, the oxidant required for complete oxidation is greater than the quantity which is contained in one bed volume of regeneration medium, and complete oxidation cannot be accomplished with a single batch soak. The method can readily be adopted for multiple soak periods, however.

Figure 2:
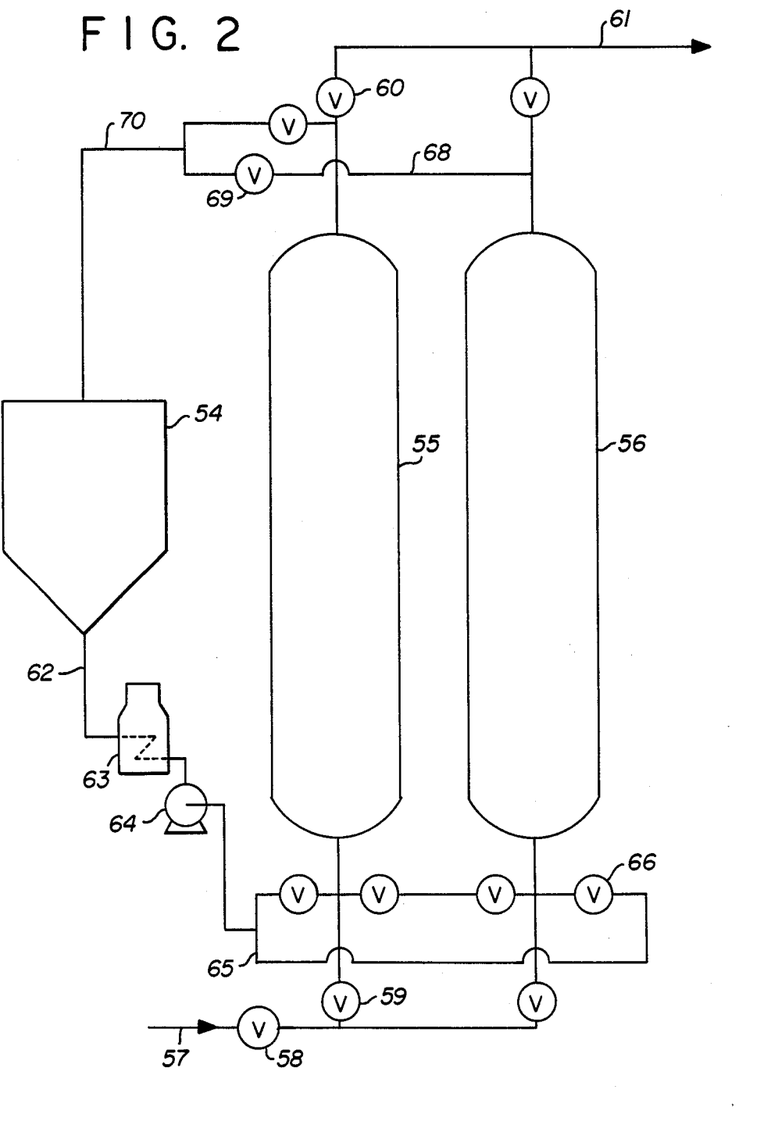
FIG. 2 is a schematic flow diagram illustrating an embodiment of the present invention utilizing a closed loop type of bed regeneration.

With respect to FIG. 2, the closed loop regeneration system shown schematically therein uses an external tank 54 to hold the amount of oxidant medium required for complete regeneration of the adsorption beds 55 and 56 and the complete oxidation of the adsorbed organic containment. Each of beds 55 and 56 contain 521 grams of silicalite adsorbent. An aqueous feedstock containing 150 ppm (wt.) toluene is fed into the system through line 57, valves 58 and 59 and into bed 55. Toluene is adsorbed on the silicalite adsorbent and the purified water is removed from the system through valve 60 and line 61. Bed 56 which contains adsorbed toluene from the previous adsorption purification cycle is regenerated while bed 55 is undergoing adsorption. To accomplish regeneration of bed 56, flow of regeneration medium from tank 54, which contains 5800 cc of a 5 wt. % hydrogen peroxide solution at a pH of 2.5 passes through line 62, heater 63, pump 64, line 65 and valve 66 into the bottom of bed 56. Partially spent regeneration fluid passing out of bed 56 was recirculated back to tank 54 through line 68, valve 69 and line 70. The solution was recirculated in the foregoing fashion for 275 minutes. During that period, the concentration of toluene that had been desorbed into the peroxide solution decreased from 397 ppm to 6 ppm, indicating that the toluene was being oxidized as it recirculated through the adsorbent in bed 56. To test bed 56 for thoroughness of regeneration, an aqueous solution of 200 ppm toluene was passed into the bed and the bed effluent analyzed for toluene. After one hour the effluent contained 1.0 ppm toluene, and after two hours the toluene concentration was less than 10 ppm. Flowrate and analytical data on the bed effluents at specific times are set forth below in Table I.

TABLE I

| | Regeneration | | |
|---|---|---|---|
| | | Effluent | |
| TIME (Min) | Flowrate (cc/min) | Toluene (ppm) | $H_2O_2$ (wt. %) |
| 20 | 54 | 27 | 3.7 |
| 65 | 35 | 397 | 1.4 |
| 125 | 80 | 36 | 2.8 |
| 155 | 78 | 18 | 2.5 |
| 185 | 80 | 38 | 2.3 |
| 275 | 110 | 6 | 1.8 |

| 2nd Cycle Adsorption - 200 ppm Toluene Feed | | |
|---|---|---|
| | | Effluent |
| Time (min) | Flowrate (cc/min) | Toluene (ppm) |
| 8 | 98 | 0.6 |
| 30 | 86 | 0.8 |
| 60 | 125 | 0.9 |
| 120 | 120 | 9.1 |
| 200 | 126 | 33 |
| 265 | 122 | 100 |
| 360 | 128 | 195 |

Figure 3:
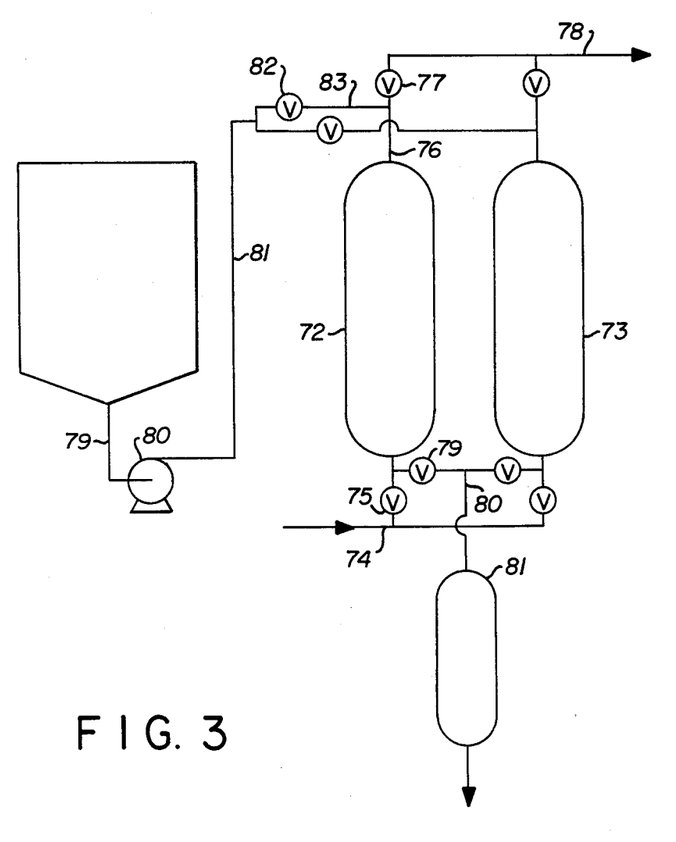
FIG. 3 is a schematic flow diagram illustrating an embodiment of the present invention utilizing an open loop type of bed regeneration with an auxiliary catalytic bed.

The process system illustrated with reference to FIG. 3 includes an open loop regeneration system combined with a catalytic bed in which the oxidant-containing medium is passed only once through the adsorption bed being regenerated. Any organic materials desorbed from the bed but not oxidized, are entrained in the effluent regeneration. medium and thereafter passed through an auxiliary bed containing molecular sieves which catalyzes and completes the oxidation process before the unreacted organic can leave the system. As in the case of the closed loop regeneration system, the open loop system of FIG. 3 uses an external tank 71 to hold the oxidant medium required for regeneration of adsorption beds 72 and 73. The organic-containing aqueous feedstock enters the system through line 74 and passes through valve 75 into adsorption bed 72. Purified effluent water leaves the system through line 76 valve 77 and line 78. To regenerate the adsorbent in bed 77 oxidant medium flows from tank 71 through line 79, pump 80, line 81, valve 82, line 83 and line 76 into the top of bed 72. A portion of the organic adsorbate is oxidized on the adsorbent and a portion is desorbed in an unreacted state and leaves bed 72 in the bed effluent which passes through valve 79 and line 80 into bed 81 which contains a catalyst, such as a molecular sieve having a relatively large number of acidic sites, which catalyzes the residual organic content of the effluent from bed 72 to compounds harmless to the environment. It should be noted that if a molecular sieve is chosen as the catalyst for use in auxiliary bed 81, adsorption capacity is of little importance. For that reason the molecular sieve need not even be hydrophilic, but ideally a balance should be made between hydrophilicity, number of acid sites, and structural stability in the oxidative medium.

The open loop catalytic bed system is advantageously used in applications where recirculation of the regeneration solution is undesirable. For instance, chlorinated hydrocarbons, when oxidized will produce chloride ions and hydrochloric acid which is very corrosive toward stainless steel. In closed loop regeneration, the acid would tend to accumulate as the oxidation progressed, leading to corrosion of pipes and vessels of the system.

Figure 4:
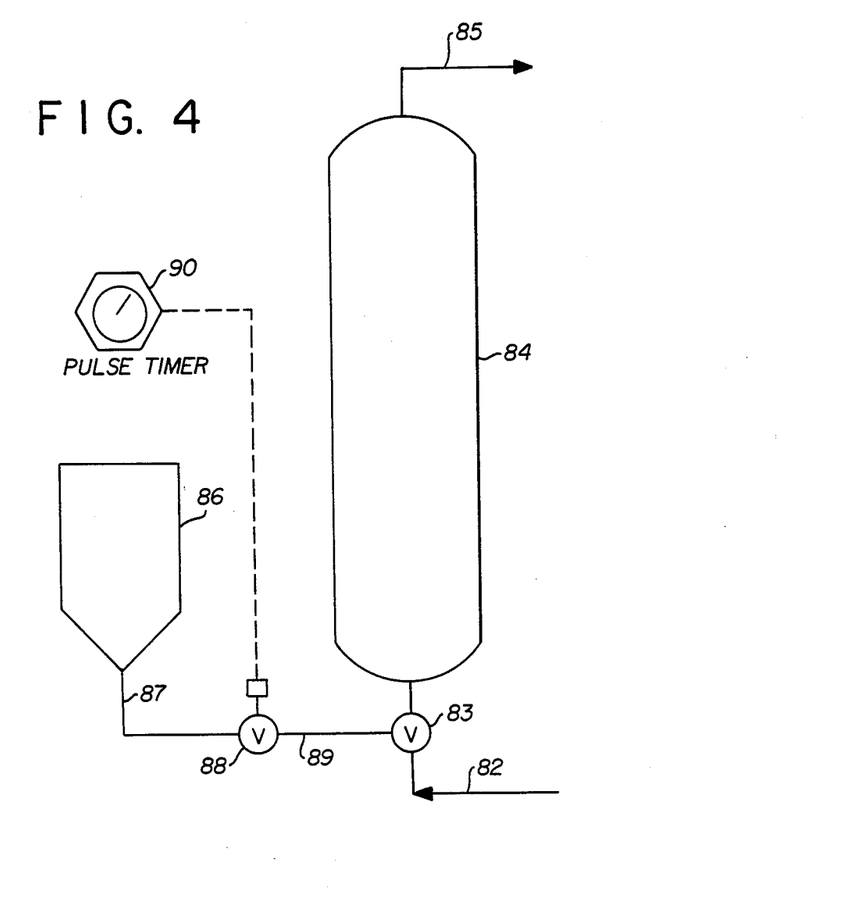
FIG. 4 is a schematic flow diagram illustrating an embodiment of the present invention utilizing a continuous type of bed regeneration.

A system which utilizes a continuous type of bed regeneration is illustrated with reference to FIG. 4. This embodiment involves injecting an oxidant medium into the adsorption bed, intermittently or continuously, advantageously into the aqueous stream being treated for organic removal as it enters the adsorbent bed. Organic substrates already adsorbed on the sieve are oxidized and converted to harmless products thus making available sites on the molecular sieve to adsorb incoming contaminant molecules. The continuous regeneration process requires only a single adsorbent bed since oxidation and adsorption occur simultaneously and the bed never becomes saturated with contaminant. As used herein, the term "continuous" refers to the regeneration, i.e. the oxidation reaction and not to the injection of oxidant into the bed. A preferred mode of operation of the continuous regeneration method is the periodic or "pulsed" addition of oxidant to the aqueous feedstock entering the bed, or injection directly into the bed, only so often as is required to maintain sufficient adsorption sites on the molecular sieve adsorbent to ensure removal of the organic contaminants to the desired degree. Thus regeneration which is adequate to maintain the functioning of a particular adsorbent bed for periods greater than would occur in the total absence of regeneration is deemed to be continuous for purposes of the present specification and the appended claims.

The operation of the continuous regeneration treatment process of this invention is demonstrated by the following experimental procedure. With respect to FIG. 4, a continuous feedstock of water containing 50 ppm of toluene is fed into the system through line 82 and valve 83 into bed 84 containing about 0.5 gram of silicalite as the adsorbent. The feed rate of the stream to be treated was 5 ml./min. Purified water containing no detectable amount of toluene was recovered from line 85. An aqueous hydrogen peroxide solution containing 30% $H_2O_2$ contained in tank 86 was injected by means of pulse timer 90 through line 87, valve 88, line 89 and valve 83 in 1.0 ml. quantities at one half hour intervals into the feedstock entering from line 82. To enhance the oxidation reaction, the bed 84 was externally heated prior to each pulse of $H_2O_2$ solution. No toluene was detectable in the bed effluent through line 85 over the period of about the first 70 minutes. The data collected for the period of 133 minutes is set forth in Table II, below.

TABLE II

| Time | Cumulative Time, Min | Effluent Toluene, ppm | Bed Outlet Temp, °C. | Remarks |
|---|---|---|---|---|
| 9:34 | | | 22 | Start |
| 9:50 | 16 | ND | 23 | |
| 9:54 | | | 23 | Heat on |
| 9:55 | | | 37 | |
| 9:56 | | | 50 | |
| 9:57 | | | 65 | |
| 9:58 | 24 | ND | 71 | |
| 10:02 | | | 64 | Add 1 ml 30% $H_2O_2$ |
| 10:05 | | | 65 | Heat off |
| 10:13 | 39 | ND | 27 | |
| 10:22 | 48 | ND | 24 | |
| 10:25 | | | | Heat on |
| 10:26 | 52 | ND | 44 | |
| 10:36 | | | 66 | Add 1 ml 30% $H_2O_2$ |
| 10:32 | | | 63 | Heat off |
| 10:45 | 71 | ND | 25 | |
| 10:52 | 78 | <1 | 25 | |
| 10:56 | | | 25 | Heat on |
| 10:57 | 83 | 2 | 40 | |
| 11:00 | | | 69 | Add 1 ml 30% $H_2O_2$ |
| 11:02 | | | 69 | Heat off |
| 11:20 | 106 | <1 | 25 | |
| 11:27 | 113 | 4 | 25 | Heat on |
| 11:31 | | | 71 | Add 1 ml 30% $H_2O_2$ |
| 11:34 | | | 63 | Heat off |
| 11:40 | | | 33 | Feed concentration = 34 ppm |
| 11:43 | 129 | ND | 27 | |
| 11:47 | 133 | | | Stop |

ND = not detectable.

For purposes of comparison, the process was repeated except that no oxidant was pulse injected into the feedstock entering the adsorption bed 84. The results are summarized in Table III below, establishing that toluene was detected in the effluent water stream through line 85 after 15 minutes, had risen to 11 ppm after 76 minutes, and to 29 ppm at 136 minutes.

TABLE III

| Time | Cumulative Minutes | Effluent Toluene (ppm) |
|---|---|---|
| 8:34 | 0 (start) | |
| 8:43 | 9 | ND |
| 8:49 | 15 | <1 |
| 8:54 | 20 | <1 |
| 9:00 | 26 | <1 |
| 9:05 | 31 | 1 |
| 9:10 | 36 | 2 |
| 9:30 | 56 | 6 |
| 9:50 | 76 | 11 |
| 10:10 | 96 | 18 |
| 10:30 | 106 | 23 |
| 11:00 | 136 | 29 |
| Feed | | 51 |

It will be understood that the process embodiments illustrated in conjunction with the Figures of the drawings can be operated using as the adsorbent any molecular sieve which is organophilic, particularly the zeolite molecular sieves having $SiO_2/Al_2O_3$ molar ratios in the range of 12 to 2000, and the regeneration carried out using an oxidant medium in which the pH has either been lowered or remains unadjusted.

The following experimental procedures were carried out to illustrate the effects of pH adjustment upon the temperature, time and oxidant concentration requirements for regenerating both highly siliceous and moderately siliceous adsorbents have loadings of various organic substrates. The various adsorption tests were run by placing 5 grams of the adsorbent to be tested into a clean one-pint jar and then adding the organic-containing aqueous test composition. The jars were then capped loosely and placed in a shaker bath at ambient temperature for 24 hours. The samples were then removed from the bath, the liquid phase decanted and the solid phase rinsed with 50 ml. of distilled water. A 0.5 gram portion of the solid phase was removed from the jar and analyzed for total carbon. To the jar containing the solid phase, a hydrogen peroxide solution of the desired strength and in the desired amount was added. In appropriate cases the peroxide solution was pH adjusted using either an acid or a base. The jar was loosely capped and placed in a shaker bath for up to 24 hours at the desired temperature. A portion of the liquid phase was retained for analysis to determine residual hydrogen peroxide content. The solid phase was rinsed with 50 ml. of distilled water and analyzed for total carbon. Two types of adsorbent were utilized, namely (a) silicalite, a silica polymorph prepared with no intentionally added alumina and having a $SiO_2/Al_2O_3$ ratio of at least 300, and (b) a zeolite having a crystal structure topologically related to silicalite but being synthesized in the absence of an organic templating agent and having a $SiO_2/Al_2O_3$ ratio of about 40. (see U.S. Pat. No. 4,257,885). This latter zeolite is identified hereinafter as LZ-105-6 and was utilized in the hydrogen (partially decationized) form. The results of the various tests are reported below in Tables IV, V, VI and VII.

TABLE IV

| Exp. # | pH Ads. Initial | pH Ads. Final | pH Regen. Initial | pH Regen. Final | % C After Ads. | % C After Regen | % C Removal |
|---|---|---|---|---|---|---|---|
| 1 | 5.5 | 9.0 | 5.5 | 3.0 | 3.2 | 0.54 | 83 |
| 2* | 5.5 | — | — | — | 1.2 | 0.25 | 79 |
| 3 | 5.5 | 6.8 | 5.5 | 4.7 | 1.2 | 0.23 | 81 |
| 4 | 5.5 | 9.0 | 3.0 | 1.8 | 3.1 | 0.16 | 95 |
| 5 | 5.5 | 9.0 | 5.5 | 6.9 | 3.2 | 1.10 | 66 |
| 6 | 5.5 | 9.0 | 9.0 | 9.6 | 3.1 | 2.00 | 35 |

*An exothermic reaction to 120° F. Sample taken after exotherm subsided, −1 hour. All samples were regenerated using 40 ml. of 30% $H_2O_2$ In the foregoing experiments, the adsorbent in Nos. 1, 4, 5, and 6 was silicalite and in Nos. 2 and 3, LZ-105-6. The following pH adjustment to the regeneration medium was made:

| Experiment No. | Treatment |
|---|---|
| 1 | None |
| 2 | None |
| 3 | None |
| 4 | Ph adjusted to 3 with 25% $H_2SO_4$ |
| 5 | 1 cc. of 0.25 M ferrous sulfate added |
| 6 | pH adjusted to 9.0 using $NH_4OH$ |

TABLE V

EFFECT OF pH ADJUSTMENT

| Exp. # | Product Type | pH Adjust | $H_2O_2$ Strength %* | Organic | Temp | % °C. Removal |
|---|---|---|---|---|---|---|
| 7 | Silicalite | No | 30% (13) | Phenol | 150 | 83 |

TABLE V-continued

EFFECT OF pH ADJUSTMENT

| Exp. # | Product Type | pH Ad-just | H₂O₂ Strength %* | Organic | Temp | % °C. Re-moval |
|---|---|---|---|---|---|---|
| 8 | Silicalite | Yes | 30% (13) | Phenol | 150 | 95 |
| 9 | Silicalite | No | 30% (10) | TCP | 150 | 19 |
| 10 | Silicalite | Yes | 30% (10) | TCP | 150 | 96 |
| 11 | LZ-105-6 (Al) | Yes | 5% (5) | Phenol | Amb. | 87 |
| 12 | LZ-105-6 (Si) | Yes | 5% (4) | Phenol | Amb. | 82 |
| 13 | LZ-105-6 (Si) | No | 5% (11) | TCP/Toluene | Amb. | 69 |
| 14 | LZ-105-6 (Si) | Yes | 5% (17) | TCP/Toluene | Amb. | 72 |

*Numbers in parentheses are number of times stoichiometric excess with respect to carbon present.
TCP = Trichloropropane
(Al) = Alumina bonded pellets
(Si) = Silica bonded pellets

TABLE VI

EFFECT OF TIME, TEMPERATURE, H₂O₂ STRENGTH

| Exp. # | Product Type | pH Ad-just | Temp. °F. | Time (Hrs) | H₂O₂ Strength %* | % °C. Removal |
|---|---|---|---|---|---|---|
| 15 | Silicalite | No | 150 | 24 | 30 (14×) | 98 |
| 16 | LZ-105-6 (Si) | Yes | Amb. | 24 | 5 (2×) | 92 |
| 17 | LZ-105-6 (Si) | Yes | Amb. | 24 | 3 (2×) | 80 |
| 18 | LZ-105-6 (Si) | Yes | Amb. | 4 | 5 (2×) | 82 |
| 19 | LZ-105-6 (Si) | Yes | Amb. | 8 | 5 (2×) | 89 |
| 20 | Silicalite | Yes | 150 | 24 | 5 (2×) | 82 |
| 21 | Silicalite | Yes | Amb. | 24 | 5 (2×) | 26 |

*Numbers in parentheses are number of times stoichiometric excess with respect to carbon present.
(Si) = Silica bonded pellets As is evident from the foregoing investigations, it has further been found that the reduction of the pH of the oxidizing regeneration medium is not the only means for increasing the catalytic activity of the molecular sieve adsorbent in the purification process. When the hydrogen cation forms of zeolites and other molecular sieves having $SiO_2/Al_2O_3$ molar ratios of from about 12 to about 100, preferably from about 20 to about 80 are utilized for the adsorption of organic contaminants from aqueous streams, the acidic sites of the zeolites per se, i.e. without the necessary presence of an extraneous acid, are capable of significantly promoting the oxidation of the adsorbed organic substrate when contact with an oxidant having an oxidation potential of at least 0.25 volt, such as hydrogen peroxide or other peroxides. This is made quite clear by the data of Experiment 2 above. The LZ-105-6 adsorbent had been employed to adsorb phenol from a 1% aqueous solution thereof. In attempting to carry out the regeneration using 40 ml. of 30% $H_2O_2$ solution, a vigorous reaction occurred upon contacting the loaded zeolite with the regeneration medium at ambient room temperature resulting in an exotherm to 120° F. The phenol removal at "ambient" temperature for LZ-105-6 was found to be 79% versus 83% for regeneration of silicalite at 150° F. with the same adsorbed substrate and the same peroxide solution (Exp.1). Similar results were obtained when trichloropropane (TCP) was the adsorbed substrate. Results are shown in Table VII below.

TABLE VII

| Exp. # | Product Type | Si/Al Ratio | H₂O₂ Strength %* | % °C. Re-moval | Temp | % Oxi-dation |
|---|---|---|---|---|---|---|
| 22 | LZ-105-6 (Al) | 40 | 3% (2×) | 84 | Amb. | 97 |
| 23 | LZ-105-6 (Al) | 40 | 5% (2×) | 85 | Amb. | 89 |
| 24 | Silicalite | 300 | 5% (2×) | 62 | 150° F. | 66 |

*Numbers in parentheses are number of times stoichiometric excess of H₂O₂ with respect to carbon present.
(Al) = Alumina bonded pellets

What is claimed is:

1. In a process for purifying aqueous media containing dissolved organic impurities which comprises providing an aqueous feedstock containing from about 5 ppb (wt.) to about 20,000 ppm (wt.) of dissolved organic compounds, contacting said feedstock with an adsorptive mass of an organophilic molecular sieve, said molecular sieve having pore diameters large enough to adsorb at least some of said organic compounds whereby said organic compounds are adsorbed thereon producing a purified water product and the molecular sieve adsorbent is regenerated and the adsorbed organic compounds oxidatively destroyed by contact with a regeneration medium comprising an aqueous solution of a compound having a standard oxidation potential of at least 0.25 volt, the improvement which comprises reducing the pH of the aqueous oxidant solution to a value less than about 7 for at least a portion of the time the oxidative regeneration reaction is proceeding.

2. Process according to claim 1 wherein the framework $SiO_2/Al_2O_3$ ratio of the molecular sieve adsorbent is from 12 to 300 and the pH of the regeneration medium is from 1 to 5.

3. Process according to claim 2 wherein the standard oxidation potential of the compound used to regenerate the molecular sieve is from 0.5 to 2.0 volts.

4. Process according to claim 3 wherein the compound used to regenerate the molecular sieve is hydrogen peroxide.

5. Process according to claim 1 wherein the molecular sieve adsorbent is a silica polymorph.

6. In a process for purifying aqueous media containing dissolved organic impurities which comprises providing an aqueous feedstock containing from about 5 ppb (wt.) to about 20,000 ppm (wt.) of dissolved organic compounds, contacting said feedstock with an adsorptive mass of an organophilic molecular sieve, said molecular sieve having pore diameters large enough to adsorb at least some of said organic compounds whereby said organic compounds are adsorbed thereon producing a purified water product and the molecular sieve adsorbent is regenerated and the adsorbed organic compounds oxidatively destroyed by contact with a regeneration medium comprising an aqueous solution of a compound having a standard oxidation potential of at least 0.25 volt, the improvement which comprises utilizing as the molecular sieve adsorbent a crystalline zeolite having a framework $SiO_2/Al_2O_3$ molar ratio of from about 5 to about 100, said zeolite being at least partially in the hydrogen cation form.

7. Process according to claim 6 wherein the crystalline zeolite has a framework $SiO_2/Al_2O_3$ molar ratio of from about 10 to 50 and contains at least 20 equivalent percent hydrogen cations.

8. Process according to claim 6 wherein the pH of the regeneration medium is in the range of 1 to 7.

9. Process according to claim 6 wherein the zeolite has the ZSM 5 crystal type of structure.

10. In a process for purifying aqueous media containing dissolved organic impurities which comprises providing an aqueous feedstock containing from about 5 ppb (wt.) to about 20,000 ppm (wt.) of dissolved organic compounds, contacting said feedstock with an adsorptive mass of an organophilic molecular sieve, said molecular sieve having pore diameters large enough to adsorb at least some of said organic compounds whereby said organic compounds are adsorbed thereon producing a purified water product and the molecular sieve adsorbent is regenerated and the adsorbed organic compounds oxidatively destroyed by contact with a regeneration medium comprising an aqueous solution of an oxidizing compound having a standard oxidation potential of at least 0.25 volt, the improvement which comprises contacting the adsorptive mass of an organophilic molecular sieve with the regeneration medium in a fixed adsorption bed by passing the regeneration medium through the said fixed adsorption bed whereby a portion of the adsorbed organic compounds are oxidized and a portion are desorbed into the regeneration medium, and thereafter contacting, without recycle through the said fixed adsorption bed, the effluent regeneration medium from said fixed bed with a composition which catalyzes the reaction of the residual organic compound therein with the oxidizing compound in said effluent regeneration medium.

11. Process according to claim 10 wherein the pH of the regeneration medium is within the range of 1 to 7.

12. Process according to claim 10 wherein the composition which catalyzes the reaction of the residual organic compound in the effluent regeneration medium is a zeolite molecular sieve having a framework $SiO_2/Al_2O_3$ ratio of from 5 to 50 and is at least partially in the hydrogen cation form.

13. In a process for purifying aqueous media containing dissolved organic impurities which comprises providing an aqueous feedstock containing from about 5 ppb (wt.) to about 20,000 ppm (wt.) of dissolved organic compounds, contacting said feedstock with an adsorptive mass of an organophilic molecular sieve, said molecular sieve having pore diameters large enough to adsorb at least some of said organic compounds whereby said organic compounds are adsorbed thereon producing a purified water product and the molecular sieve adsorbent is regenerated and the adsorbed organic compounds oxidatively destroyed by contact with a regeneration medium comprising an aqueous solution of a compound having a standard oxidation potential of at least 0.25 volt, the improvement which comprises maintaining the said adsorptive mass in a fixed adsorption bed and passing the aqueous feedstock containing the dissolved organic compounds thereinto together with a sufficient quantity of the said regeneration medium to prevent the adsorptive capacity of the adsorptive mass from being completely exhausted.

14. Process according to claim 13 wherein the pH of the regeneration medium is within the range of 1 to 7.

15. Process according to claim 13 wherein the pH of the regeneration medium is within the range of 1 to 5.

* * * * *